US012424134B2

(12) United States Patent
Park et al.

(10) Patent No.: US 12,424,134 B2
(45) Date of Patent: Sep. 23, 2025

(54) DISPLAY DEVICE FOR ADJUSTING GAMMA VOLTAGE AND METHOD FOR OPERATING THE SAME

(71) Applicant: MagnaChip Semiconductor, Ltd., Chungcheongbuk-do (KR)

(72) Inventors: Jusang Park, Cheongju-si (KR); Kyeongwoo Kim, Siheung-si (KR); Hyoungkyu Kim, Cheongju-si (KR)

(73) Assignee: MagnaChip Semiconductor, Ltd., Cheongju-si (KR)

( * ) Notice: Subject to any disclaimer, the term of this patent is extended or adjusted under 35 U.S.C. 154(b) by 0 days.

(21) Appl. No.: 18/326,174

(22) Filed: May 31, 2023

(65) Prior Publication Data

US 2024/0054931 A1 Feb. 15, 2024

(30) Foreign Application Priority Data

Aug. 11, 2022 (KR) ........................ 10-2022-0100379

(51) Int. Cl.
*G09G 3/20* (2006.01)

(52) U.S. Cl.
CPC ......... *G09G 3/20* (2013.01); *G09G 2310/027* (2013.01); *G09G 2310/0297* (2013.01); *G09G 2320/0276* (2013.01); *G09G 2330/028* (2013.01)

(58) Field of Classification Search
None
See application file for complete search history.

(56) References Cited

U.S. PATENT DOCUMENTS 11,062,649 B2 7/2021 Kim et al.
2020/0211457 A1* 7/2020 Kim .................... G09G 3/3233
2020/0251033 A1* 8/2020 Ma .......................... G09G 3/20

* cited by examiner

*Primary Examiner* — Brian M Butcher
(74) *Attorney, Agent, or Firm* — NSIP Law

(57) ABSTRACT

A display device includes: a display panel including a plurality of pixels, a driver integrated circuit (IC) configured to convert digital data corresponding to an input image to an analog data voltage using a gamma voltage, and to supply the analog data voltage to the plurality of pixels, and a power supply configured to supply a pixel driving voltage to the display panel and the driver IC, and the driver IC includes: a weight selector configured to select a weight for adjusting the gamma voltage based on an amount of change in the pixel driving voltage supplied from the power supply, and a gamma reference voltage generating circuit configured to generate a gamma reference voltage based on the selected weight.

17 Claims, 11 Drawing Sheets

FIG. 5

| GVA_WEIGHT[2:0] | GVA_VREGT_VR | GVA_VREGB_VR |
|---|---|---|
| "LXX" (Default)(X1.0) | SET1 | SET2 |
| "HLL"(X0.6) | SET1 + 2α | SET2 - 2α |
| "HLH"(X0.8) | SET1 + α | SET2 - α |
| "HHL"(X1.2) | SET1 - α | SET2 + α |
| "HHH"(X1.4) | SET1 - 2α | SET2 + 2α |

510 401 511 411 513 521 523

| GVA_WEIGHT[2:0] (510) | ELVDD_REF(+Δ) (311) | GVA_VREGT_VR (401) | VREGT (403) |
|---|---|---|---|
| "LXX" (Default) | (4.6v +Δ) X 0.5 | 0.6V | 7.0V + (Δ) |
| "HLL"(X0.6) | (4.6v +Δ) X 0.3 | 1.06V | 7.0V + (0.6Δ) |
| "HLH"(X0.8) | (4.6v +Δ) X 0.4 | 0.83V | 7.0V + (0.8Δ) |
| "HHL"(X1.2) | (4.6v +Δ) X 0.6 | 0.37V | 7.0V + (1.2Δ) |
| "HHH"(X1.4) | (4.6v +Δ) X 0.7 | 0.14V | 7.0V + (1.4Δ) |

| GVA_WEIGHT[2:0] (510) | ELVDD_REF(+Δ) (311) | GVA_VREGB_VR (411) | VREGB (413) |
|---|---|---|---|
| "LXX" (Default) | (4.6v +Δ) X 0.5 | 0.9V | 1.0V + (Δ) |
| "HLL"(X0.6) | (4.6v +Δ) X 0.3 | 0.44V | 1.0V + (0.6Δ) |
| "HLH"(X0.8) | (4.6v +Δ) X 0.4 | 0.67V | 1.0V + (0.8Δ) |
| "HHL"(X1.2) | (4.6v +Δ) X 0.6 | 1.13V | 1.0V + (1.2Δ) |
| "HHH"(X1.4) | (4.6v +Δ) X 0.7 | 1.36V | 1.0V + (1.4Δ) |

DISPLAY DEVICE FOR ADJUSTING GAMMA VOLTAGE AND METHOD FOR OPERATING THE SAME

CROSS REFERENCE TO RELATED APPLICATION

The present application claims the benefit under 35 U.S.C. 119(a) of Korea Patent Application No. 10-2022-0100379, filed Aug. 11, 2022, the entire disclosure of which is incorporated herein by reference for all purposes.

BACKGROUND

1. Field

The following description relate to a display device for adjusting a gamma voltage and a method for operating the same.

2. Description of the Related Art

In general, a display device includes a display panel and a driver integrated circuit (IC). The driver IC is the circuitry that drives the display panel including a pixel array, and includes a gate driving driver and a source driving driver. The gate driving driver supplies a scan signal (or gate signal) to gate lines respectively connected to pixels of the pixel array. The source driving driver includes a DAC (Digital-to-Analog Converter) to convert digital data corresponding to an input image to an analog data voltage, and supplies the converted analog data voltage to data lines respectively connected to the pixels of the pixel array.

Each of the pixels included in the pixel array of the display panel receives a pixel driving voltage through a power line and receives a scan signal and an analog data voltage through a gate line and a data line, thereby displaying an image according to the analog data.

The pixel driving voltage supplied to each pixel may be changed according to internal and/or external loads of the display panel, and the changed pixel driving voltage may affect the luminance of each pixel. For example, even when the analog data voltage supplied to each pixel is the same, the luminance of each pixel may be changed if the pixel driving voltage is changed. Accordingly, there is a need to provide a method for minimizing a change in luminance due to the pixel driving voltage that varies depending on internal and/or external loads of the display panel.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a display device includes a display panel including a plurality of pixels, a driver integrated circuit (IC) configured to convert digital data corresponding to an input image to an analog data voltage using a gamma voltage, and to supply the analog data voltage to the plurality of pixels, and a power supply configured to supply a pixel driving voltage to the display panel and the driver IC, wherein the driver IC includes a weight selector configured to select a weight for adjusting the gamma voltage based on an amount of change in the pixel driving voltage supplied from the power supply and a gamma reference voltage generating circuit configured to generate a gamma reference voltage based on the selected weight.

The gamma reference voltage generating circuit may include a weight circuit configured to boost or reduce the pixel driving voltage by a specified multiple based on the selected weight, and a gamma reference voltage generator configured to generate the gamma reference voltage based on the boosted or reduced pixel driving voltage and a reference voltage corresponding to the selected weight.

The weight circuit may include a voltage divider circuit configured to divide the pixel driving voltage using a plurality of series-connected resistor elements, a multiplexer connected to the voltage divider circuit and configured to select and output one of pixel driving voltages obtained through division by the voltage divider circuit according to a first control signal generated based on the selected weight, a first switch connected between the voltage divider circuit and the gamma reference voltage generator and configured to be turned on/off by a second control signal generated based on the selected weight, and a second switch connected between the multiplexer and the gamma reference voltage generator and configured to be turned on/off by the second control signal.

The second control signal may selectively turn on one of the first switch and the second switch.

The specified multiple may be a half value of the selected weight.

The reference voltage may be determined based on a table indicating at least one reference voltage for each weight.

The gamma reference voltage generator may include a first gamma reference voltage generator configured to generate a first gamma reference voltage based on the boosted or reduced pixel driving voltage and a first reference voltage corresponding to the selected weight, and a second gamma reference voltage generator configured to generate a second gamma reference voltage based on the boosted or reduced pixel driving voltage and a second reference voltage corresponding to the selected weight, and the first gamma reference voltage may be an upper limit value, and the second gamma reference voltage may be a lower limit value.

The weight may be determined based on a difference between the pixel driving voltage output from the power supply and the pixel driving voltage input to the driver IC.

The weight may be determined based on a difference between the pixel driving voltage input to the driver IC and the pixel driving voltage input to the display panel.

The driver IC may further include a gamma voltage output circuit configured to generate and output the gamma voltage based on the gamma reference voltage.

In another general aspect, a method for operating a display device including a display panel, a driver IC, and a power supply, the method includes selecting, by the driver IC, a weight for adjusting a gamma voltage of the DAC (Digital-to-Analog Converter) based on an amount of change in a pixel driving voltage supplied from the power supply, generating, by the driver IC, a gamma reference voltage that is used to generate the gamma voltage based on the selected weight, and adjusting, by the driver IC, the gamma voltage using the generated gamma reference voltage.

The generating of the gamma reference voltage may include boosting or reducing the pixel driving voltage by a specified multiple based on the selected weight, and generating the gamma reference voltage based on the boosted or reduced pixel driving voltage and a reference voltage corresponding to the selected weight.

The pixel driving voltage may be boosted or reduced by the specified multiple using a voltage divider circuit including a plurality of series-connected resistor elements to divide the pixel driving voltage, and a multiplexer connected to the voltage divider circuit.

The multiplexer may operate according to a control signal generated based on the selected weight.

The specified multiple may be a half value of the selected weight.

The reference voltage may be determined based on a table indicating at least one reference voltage for each weight.

The generating of the gamma reference voltage may include generating a first gamma reference voltage based on the boosted or reduced pixel driving voltage and a first reference voltage corresponding to the selected weight, and generating a second gamma reference voltage based on the boosted or reduced pixel driving voltage and a second reference voltage corresponding to the selected weight, and herein the first gamma reference voltage may be an upper limit value, and the second gamma reference voltage may be a lower limit value.

The selecting of the weight may include selecting the weight based on a difference between the pixel driving voltage output from the power supply and the pixel driving voltage input to the driver IC.

The selecting of the weight may include selecting the weight based on a difference between the pixel driving voltage input to the driver IC and the pixel driving voltage input to the display panel.

According to one or more embodiments of the present disclosure, it is possible to control a gate-source voltage of the pixel driving transistor by adjusting the gamma voltage of a digital-to-analog converter (DAC) based on the amount of change in the pixel driving voltage in the display device, thus performing filtering for a specific noise. In this way, it is possible to minimize a change in luminance due to a change in the pixel driving voltage. Other features and aspects will be apparent from the following detailed description, the drawings and the claims.

BRIEF DESCRIPTION OF THE DRAWINGS

FIG. 5 illustrates a diagram showing an example of a reference voltage table for each GVA weight according to one or more embodiments of the present disclosure;

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
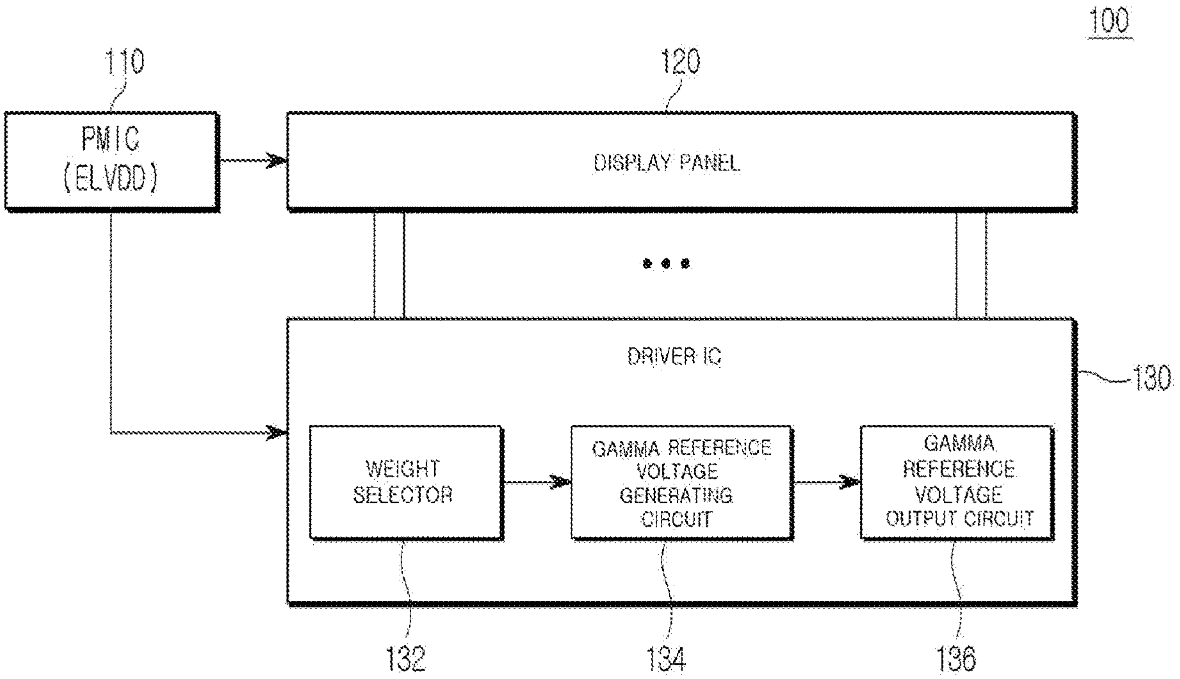
FIG. 1 illustrates a block diagram of a display device according to one or more embodiments of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

Hereinafter, embodiments will be described with reference to the accompanying drawings. Herein, when it is mentioned that a component (or an area, a layer, a part, etc.) is "on", "connected to", or "coupled to" another component, it may mean that the component may be directly connected/coupled to the other component or a third component may be disposed therebetween.

The features, advantages and method for accomplishment of the present disclosure will be more apparent from referring to the following detailed embodiments described as well as the accompanying drawings. However, the present disclosure is not limited to the embodiment to be disclosed below and is implemented in different and various forms. The embodiments bring about the complete disclosure of the present disclosure and are only provided to make those skilled in the art fully understand the scope of the present disclosure. The present disclosure is just defined by the scope of the appended claims. The same reference numerals throughout the disclosure correspond to the same elements.

What one component is referred to as being "connected to" or "coupled to" another component includes both a case where one component is directly connected or coupled to another component and a case where a further another component is interposed between them. Meanwhile, what one component is referred to as being "directly connected to" or "directly coupled to" another component indicates that a further another component is not interposed between them. The term "and/or" includes each of the mentioned items and one or more all of combinations thereof.

Terms used in the present specification are provided for description of only specific embodiments of the present disclosure, and not intended to be limiting. In the present specification, an expression of a singular form includes the expression of plural form thereof if not specifically stated. It will be further understood that the terms "comprises" and/or "comprising," when used in this specification, do not preclude the presence or addition of one or more other components, steps, operations, and/or elements.

While terms such as the first and the second, etc., can be used to describe various components, the components are not limited by the terms mentioned above. The terms are used only for distinguishing between one component and other components.

Therefore, the first component to be described below may be the second component within the spirit of the present disclosure. Unless differently defined, all terms used herein including technical and scientific terms have the same meaning as commonly understood by one of ordinary skill in the art to which the present disclosure belongs. Also, commonly used terms defined in the dictionary should not be ideally or excessively construed as long as the terms are not clearly and specifically defined in the present application.

A term "part" or "module" used in the embodiments may mean software components or hardware components such as a field programmable gate array (FPGA), an application specific integrated circuit (ASIC). The "part" or "module" performs certain functions. However, the "part" or "module" is not meant to be limited to software or hardware. The "part" or "module" may be configured to be placed in an addressable storage medium or to restore one or more processors. Thus, for one example, the "part" or "module" may include components such as software components, object-oriented software components, class components, and task components, and may include processes, functions, attributes, procedures, subroutines, segments of a program code, drivers, firmware, microcode, circuits, data, databases, data structures, tables, arrays, and variables. Components and functions provided in the "part" or "module" may be combined with a smaller number of components and "parts" or "modules" or may be further divided into additional components and "parts" or "modules".

Methods or algorithm steps described relative to some embodiments of the present disclosure may be directly implemented by hardware and software modules that are executed by a processor or may be directly implemented by a combination thereof. The software module may be resident on a RAM, a flash memory, a ROM, an EPROM, an EEPROM, a resistor, a hard disk, a removable disk, a CD-ROM, or any other type of record medium known to those skilled in the art. An exemplary record medium is coupled to a processor and the processor can read information from the record medium and can record the information in a storage medium. In another way, the record medium may be integrally formed with the processor. The processor and the record medium may be resident within an application specific integrated circuit (ASIC).

FIG. 1 illustrates a block diagram of a display device according to one or more embodiments of the present disclosure. The configuration of the display device shown in FIG. 1 is an embodiment. For example, some of the components shown in FIG. 1 may be omitted, and other components not shown in FIG. 1 may be further added.

Figure 2:
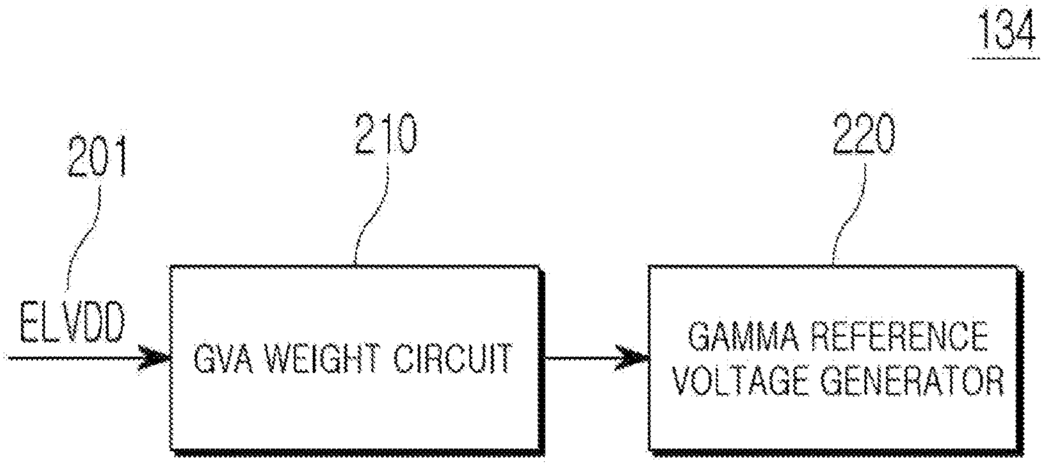
FIG. 2 illustrates a block diagram of a gamma reference voltage generating circuit according to one or more embodiments of the present disclosure.
Figure 3:
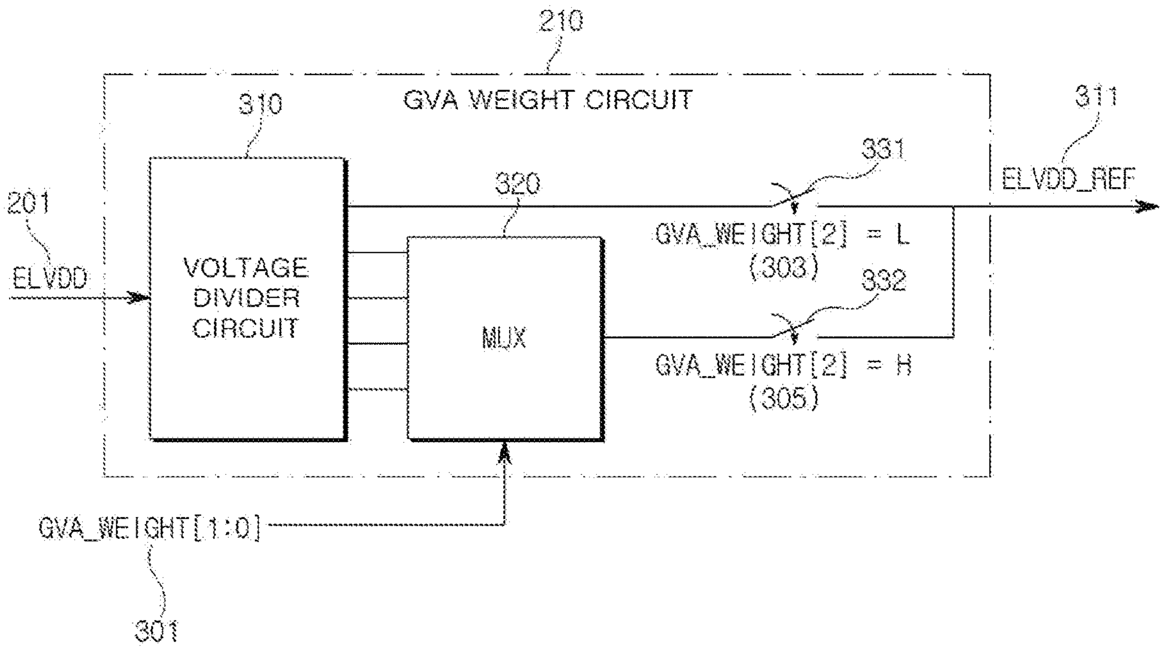
FIG. 3 illustrates a diagram showing a configuration of a gamma voltage adjustment (GVA) weight circuit according to one or more embodiments of the present disclosure.
Figure 4:
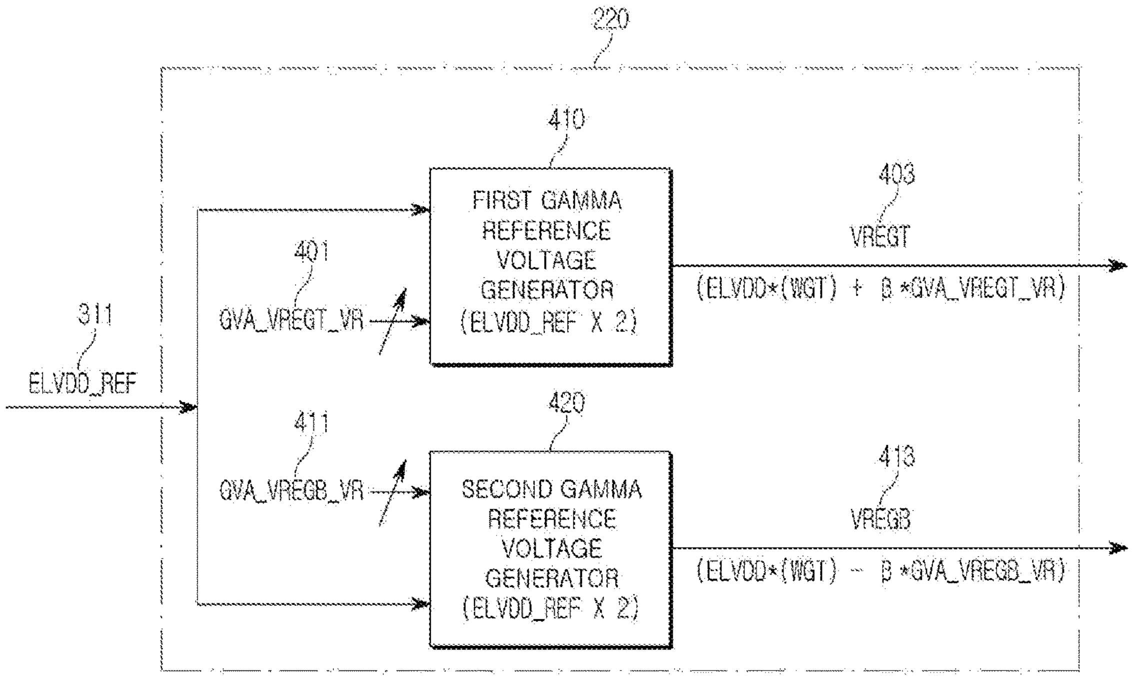
FIG. 4 illustrates a block diagram of a gamma reference voltage generator according to one or more embodiments of the present disclosure.

Herein, it is noted that use of the term 'may' with respect to an example or embodiment, e.g., as to what an example or embodiment may include or implement, means that at least one example or embodiment exists where such a feature is included or implemented while all examples and embodiments are not limited thereto. In the following description, each of the illustrated components may be implemented as one chip or may be implemented with different chips. Hereinafter, some components of FIG. 1 will be described with reference to FIGS. 2 to 5. FIG. 2 is a block diagram of a gamma reference voltage generating circuit according to various embodiments of the present disclosure. FIG. 3 illustrates a diagram showing a configuration of a gamma voltage adjustment (GVA) weight circuit according to one or more embodiments of the present disclosure, and FIG. 4 illustrates a diagram showing a configuration of a gamma reference voltage generator according to one or more embodiments of the present disclosure. FIG. 5 illustrates a diagram showing an example of a reference voltage table for each GVA weight according to one or more embodiments of the present disclosure.

Referring to FIG. 1, a display device 100 may include a power supply 110, a display panel 120, and a driver IC 130.

The power supply 110 may be a power management integrated circuit (PMIC) that manages power for the operation of the display device 100. In an example, the power supply 110 may provide a pixel driving voltage (ELVDD) to the display panel 120 and the driver IC 130.

The display panel 120 may include a pixel array to display an input image. In an example, the pixel array may include pixels including a red (R) sub-pixel, a green (G) sub-pixel, and a blue (B) sub-pixel. Each pixel may include a liquid crystal capacitor and a thin film transistor, and the pixels may be arranged in a matrix form. A source of the thin film transistor included in each pixel may be connected to a data line connected to a source driving driver (not shown) of the driver IC 130, and a gate of the thin film transistor may be connected to a gate line connected to a gate driving driver (not shown). Each pixel may display an input image according to a scan signal applied from a gate driving driver (not shown) through a gate line and an analog data voltage applied from a source driving driver (not shown) through a data line. In an example, when the scan signal is applied through the gate line, each pixel may be electrically connected to the data line to receive the analog data voltage. Each pixel may allow a corresponding light emitting device to emit light with a current corresponding to the input analog data voltage.

The display panel 120 may receive a pixel driving voltage (ELVDD) from the power supply 110 through a power line. In this case, the pixel driving voltage supplied from the power supply 110 may be applied to each pixel of the pixel array in the display panel 120.

In an example, various loads may exist in the power line to which the pixel driving voltage (ELVDD) is supplied. For example, at least one resistive element may be present in the power line between the power supply 110 and the display panel 120, or a noise component may be present due to external influences. In this case, the pixel driving voltage (ELVDD) supplied from the power supply 110 to the display panel 120 may change (e.g., voltage drop or rise) due to loads or noise present on the power line.

A change in the pixel driving voltage (ELVDD) may affect light emission luminance of the light emitting device (OLED) of each pixel. For example, the luminance of light emitted by light emitting devices (OLEDs) of each pixel in the display panel 120 may be proportional to a current flowing through the light emitting devices. In this case, the current flowing through the light emitting device may change due to a pixel driving voltage applied through the power line as well as an analog data voltage applied through the data line. Accordingly, when the pixel driving voltage changes, even though the analog data voltages applied through the data line of the light emitting devices are the same, the current flowing through the light emitting device can change, causing a change in the luminance of the light emitted from the light emitting device. Accordingly, one or more embodiments of the present disclosure will describe a method for compensating for luminance when the pixel driving voltage supplied to the display panel 120 from the power supply 110 changes.

The driver IC 130 may include a gate driving driver (not shown) and a source driving driver (not shown).

The gate driving driver (not shown) may be connected to pixels of the display panel 120 through gate lines, respectively. The gate driving driver (not shown) may drive the pixels by supplying a scan signal to the pixels through the gate lines.

The source driving driver (not shown) may be connected to pixels of the display panel 120 through data lines, respectively. The source driving driver (not shown) may include a digital-to-analog converter (DAC, not shown) to convert digital video data into an analog data voltage. The source driving driver (not shown) may supply the converted analog data voltage to the pixels through the data lines, respectively.

The source driving driver (not shown) may use a gamma voltage when the digital video data is converted to the analog data voltage.

When the display device is driven, the luminance should be in linear proportion to the digital video data. However, a pixel element may not operate linearly due to the characteristics of the pixel element and noises occurring in the vicinity. The analog data voltage generated by the DAC may change according to the characteristics of the pixel element such that luminance can be generated to be linearly proportional to digital video data. The gamma voltage may be a reference voltage that enables an analog data voltage to be generated such that luminance is linearly proportional to digital video data.

The gamma voltage may be a reference voltage that generates an analog data voltage in which luminance is linearly generated in digital video data.

Gamma voltage can be determined and modified through pre-release testing to reflect the device characteristics of each product.

The present disclosure proposes a method for adjusting a gamma voltage that can be fixed and released in response to changes in the pixel driving voltage.

According to one or more embodiments of the present disclosure, the driver IC 130 may adjust the gamma voltage of the DAC of the source driving driver.

The driver IC 130 may include a weight selector 132 that selects a weight for adjusting a gamma voltage according to the amount of change in the pixel driving voltage (hereinafter referred to as a "GVA weight"), and a gamma reference voltage generating circuit 134 that generates a gamma voltage of the DAC by using the selected weight.

In an example, the weight selector 132 may select a gamma voltage adjustment (GVA) weight based on a difference between the pixel driving voltage (e.g., ELVDD) output from the power supply 110 and the pixel driving voltage (e.g., ELVDD_D±α) received from the driver IC 130.

In an example, the weight selector 132 may select a GVA weight based on a difference between a pixel driving voltage (e.g., ELVDD_D±α) input to the driver IC 130 after being changed due to a load between the power supply 110 and the driver IC 130 and a pixel driving voltage (e.g., ELVDD P±2α) input to the display panel 120 after being changed due to a load between the power supply 110 and the display panel 120.

The GVA weight may be selected from, for example, any one of 0.6, 0.8, 1.0, 1.2, and 1.4. This is merely an example, and the value of the GVA weight in various embodiments of the present disclosure is not necessarily limited thereto.

The weight selector 132 may generate a control signal indicating the selected GVA weight and provide the generated control signal to the gamma reference voltage generating circuit 134. The control signal indicating the GVA weight may be GVA_WEIGHT[2:0]. For example, the GVA_WEIGHT[2:0] signal may be generated as shown in Table 1 below.

TABLE 1

| GVA weight | GVA_WEIGHT[2:0] |
|---|---|
| 1 (default) | LXX |
| 0.6 | HLL |
| 0.8 | HLH |
| 1.2 | HHL |
| 1.4 | HHH |

As shown in Table 1, the weight selector 132 may generate a GVA_WEIGHT[2:0] signal of "LXX" when 1, that is the default GVA weight, is selected, and generate a GVA WEIGHT[2:0] signal of "HLL" when 0.6 is selected as the GVA weight. Here, the most significant bit value of GVA_WEIGHT[2:0] may indicate whether the selected GVA weight is a default weight. For example, when the most significant bit value of GVA_WEIGHT[2:0] is "L", it may indicate that the selected GVA weight is the default GVA weight, and when the most significant bit value of GVA_WEIGHT[2:0] is "H", it may indicate that the selected GVA weight is not the default GVA weight. According to one or more embodiments, the gamma reference voltage generating circuit 134 may include a GVA weight circuit 210 and a gamma reference voltage generator 220, as shown in FIG. 2 to generate and output the gamma voltage of the DAC using the selected GVA weight.

According to one or more embodiments, the GVA weight circuit 210 may boost or reduce the pixel driving voltage (ELVDD) 201 based on the selected GVA weight. For example, the GVA weight circuit 210 may boost or reduce the pixel driving voltage (ELVDD) 201 by a specified multiple based on the GVA_WEIGHT[2:0] signal generated by the weight selector 132. In an example, the pixel driving voltage (ELVDD) 201 may refer to a voltage (ELVDDini±Δ) obtained when an initial pixel driving voltage (ELVDDini) output from the power supply 110 is changed due to a load by a first variation±Δ. In an example, the specified multiple may be specified as half the GVA weight corresponding to the GVA_WEIGHT[2:0] signal. For example, when the GVA WEIGHT[2:0] signal is "LXX", it means that the default weight of 1 is selected, so the specified multiple can be 0.5. When the GVA_WEIGHT[2:0] signal generated by the weight selector 132 is "LXX", the GVA weight circuit 210 may boost or reduce the input pixel driving voltage (ELVDD) by 0.5 times (ELVDD×0.5) and output the input pixel driving voltage (ELVDD). As another example, when the GVA WEIGHT[2:0] signal is "HLH", it means that the weight of 0.8 is selected, so the specified multiple may be 0.4. When the GVA_WEIGHT[2:0] signal generated by the weight selector 132 is "HLH", the GVA weight circuit 210 may boost or reduce the input pixel driving voltage (ELVDD) by 0.4 times (ELVDD×0.4) and output the input pixel driving voltage (ELVDD).

In an example, the GVA weight circuit 210 includes a voltage divider circuit 310, a Multiplexer (MUX) 320, a first switch 331, and a second switch 332, as shown in FIG. 3.

The voltage divider circuit 310 may include a plurality of resistor elements connected in series between the pixel driving voltage input terminal and ground. The voltage divider circuit 310 may divide the pixel driving voltage (ELVDD) 201 using a plurality of series-connected resistor elements. The voltage divider circuit 310 may provide, for example, (×0.5) ELVDD to the first switch 331, (×0.3) ELVDD, (×0.4) ELVDD, (×0.6) ELVDD, and (×0.7) ELVDD to the MUX 320.

The MUX 320 may be connected to the voltage divider circuit 310 to output any one of voltages output by the voltage divider circuit 310 after voltage division. For example, the MUX 320 may select and output any one of the voltages output from the voltage divider circuit 310 according to a first control signal generated based on the GVA weight. The first control signal may be a GVA_WEIGHT [1:0] 301, which is a signal corresponding to the lower 2 bits among the GVA_WEIGHT[2:0] signals. Here, voltages provided from the voltage divider circuit 310 and output from the MUX 320 may be (×0.3) ELVDD, (×0.4) ELVDD, (×0.6) ELVDD, and (×0.7) ELVDD. For example, the MUX 320 may be set to select and output (×0.3) ELVDD when "GVA WEIGHT[1:0]=LL", select and output (×0.4) ELVDD when "GVA WEIGHT[1:0]=LH", select and output (×0.6) ELVDD when "GVA WEIGHT[1:0]=HL", and select and output (×0.7) ELVDD when "GVA WEIGHT[1:0]=HH".

The first switch 331 may be connected between the voltage divider circuit 310 and the gamma reference voltage generator 220 and may be turned on/off by a second control signal generated based on the GVA weight. The second control signal may be GVA_WEIGHT[2], which is a signal corresponding to the most significant bit of the GVA_WEIGHT[2:0] signal. When GVA_WEIGHT[2] is "L", the first switch 331 may be turned on to provide the boosted or reduced pixel driving voltage provided from the voltage divider circuit 310 to the gamma reference voltage generator 220. Here, the boosted or reduced pixel driving voltage provided from the voltage divider circuit 310 may be (×0.5) ELVDD.

The second switch 332 may be connected between the MUX 320 and the gamma reference voltage generator 220 and may be turned on/off by a second control signal generated based on the GVA weight. The second control signal may be GVA_WEIGHT[2], which is a signal corresponding to the most significant bit of the GVA_WEIGHT[2:0] signal. When GVA_WEIGHT[2] is "H", the SECOND switch 332 may be turned on to provide the boosted or reduced pixel driving voltage provided from the MUX 320 to the gamma reference voltage generator 220. The boosted or reduced pixel driving voltage provided from the MUX 320 may be any one of (×0.3) ELVDD, (×0.4) ELVDD, (×0.6) ELVDD, and (×0.7) ELVDD.

According to one or more embodiments, the gamma reference voltage generator 220 may generate first and second gamma reference voltages to be used in the gamma voltage output circuit 136 based on the boosted or reduced pixel driving voltage provided from the GVA weight circuit 210 and reference voltages. The reference voltages may be selected based on the GVA weight selected by the weight selector 132.

In an example, the gamma reference voltage generator 220 may include a first gamma reference voltage generator 410 and a second gamma reference voltage generator 420 as shown in FIG. 4.

The first gamma reference voltage generator 410 may generate and output the first gamma reference voltage (VREGT) 403 based on the boosted or reduced pixel driving voltage (ELVDD_REF) 311 and the first reference voltage (GVA_VREGT_VR) 401. The first gamma reference voltage VREGT 403 is an upper limit value of the gamma reference voltage, and may be expressed as ELVDD×(WGT)+β×GVA_VREGT_VR. Here, WGT may mean a selected GVA weight. For example, the first gamma reference voltage generator 410 may boost the boosted or reduced pixel driving voltage (ELVDD_REF) 311 by two times, multiply the first reference voltage (GVA_VREGT_VR) 401 by a specified coefficient β, and then add the pixel driving voltage (ELVDD_REF×2), which has been boosted or reduced by two times, and the first reference voltage (β×GVA_VREGT_VR) to which the specified coefficient β has been applied, to generate the first gamma reference voltage. Here, the pixel driving voltage (ELVDD_REF×2), which has been boosted by two times, may be expressed as ELVDD×(WGT). The reason for this is that the ELVDD_REF 311 is a value obtained by boosting or reducing the ELVDD 201 by a multiple corresponding to a half value of the selected GVA weight (WGT).

The second gamma reference voltage generator 420 may generate and output the second gamma reference voltage (VREGB) 413 based on the boosted or reduced pixel driving voltage (ELVDD_REF) 311 and the second reference voltage (GVA_VREGB_VR) 411. The second gamma reference voltage (VREGB) 413 is a lower limit value of the gamma reference voltage, and may be expressed as ELVDD×(WGT)−β×GVA_VREGB_VR. Here, WGT may mean a selected GVA weight. For example, the second gamma reference voltage generator 420 may boost the boosted pixel driving voltage (ELVDD_REF) 311 by two times, multiply the second reference voltage (GVA_VREGB_VR) 411 by a specified coefficient β, and then subtract the second reference voltage (β×GVA_VREGB_VR), to which the specified coefficient β has been applied, from the pixel driving voltage (ELVDD_REF×2), which has been boosted by two times, to generate a second gamma reference voltage.

In an example, the first reference voltage (GVA_VREGT_VR) 401 and the second reference voltage (GVA_VREGB_VR) 411 may be selected based on a pre-stored table for a reference voltage for each GVA weight as shown in FIG. 5. As shown in FIG. 5, the table containing a reference voltage for each GVA weight may represent a first reference voltage (GVA_VREGT_VR) 401 and a second reference voltage (GVA_VREGB_VR) 411 for each GVA_WEIGHT[2:0] signal 510 corresponding to the selected GVA weight. For example, when the selected GVA weight is 1, the gamma reference voltage generator 220 may select a value of SET1 511 and a value of SET2 513 as the first reference voltages (GVA_VREGT_VR) 401 and the second reference voltage (GVA_VREGB_VR) 411 based on the table containing a reference voltage for each GVA weight. The values of SET1 and SET2 may be preset voltage values. As another example, when the selected GVA weight is 1.2, the gamma reference voltage generator 220 may select a value of (SET1−α) 521 as the first reference voltages (GVA_VREGT_VR) 401 and a value of (SET2+a) 523 as the second reference voltage (GVA_VREGB_VR) 411 based on the table containing a reference voltage for each GVA weight in FIG. 5. In an example, "a" may be determined based on a difference between an initial pixel driving voltage output from the power supply 110 and a pixel driving voltage input to the driver IC 130.

The gamma voltage output circuit 136 may generate and output a gamma voltage to be used in the DAC based on the first gamma reference voltage and the second gamma reference voltage received from the gamma reference voltage generator 220. The gamma voltage generated by the gamma voltage output circuit 136 may be determined based on the first gamma reference voltage and the second gamma reference voltage. For example, when the first gamma reference voltage and the second gamma reference voltage are changed, the gamma voltage generated by the gamma voltage output circuit 136 may also be changed.

Figure 6:
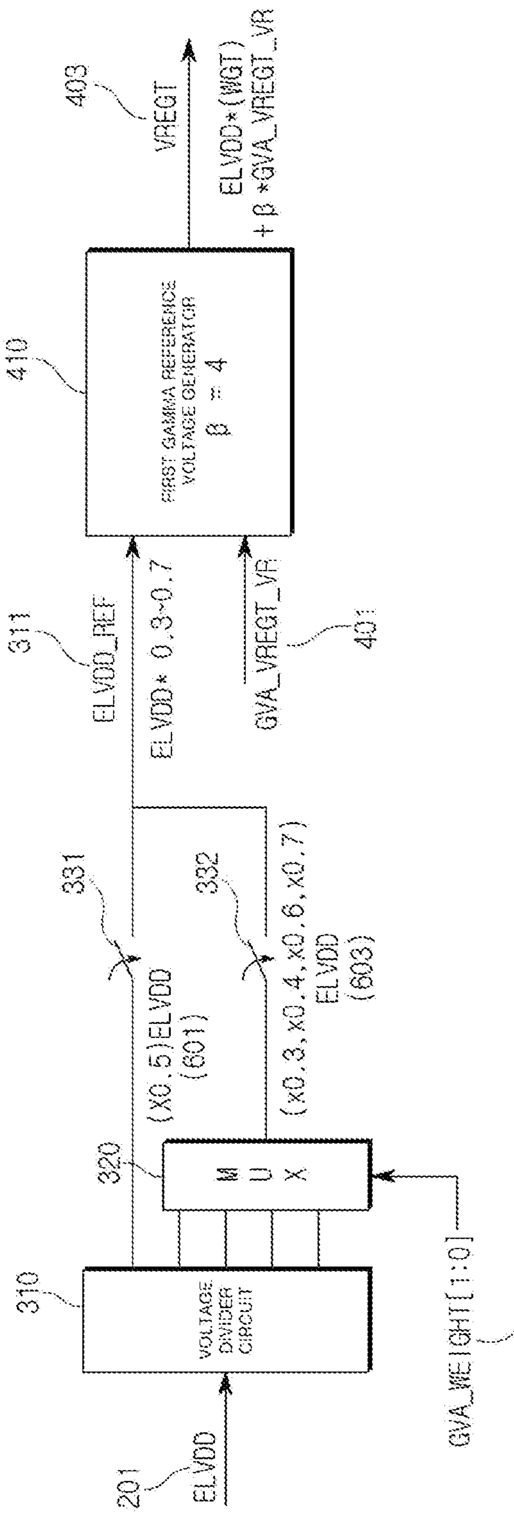
FIG. 6 illustrates an exemplary diagram of generating a first gamma reference voltage (VREGT) based on a GVA weight according to one or more embodiments of the present disclosure.

FIG. 6 illustrates a diagram showing an example of generating a first gamma reference voltage (VREGT) 403 based on a GVA weight in one or more embodiments of the present disclosure.

Referring to the table in FIG. 6, the first gamma reference voltage (VREGT) 403 generated by the gamma reference voltage generating circuit 134 when the pixel driving voltage (ELVDD) 201 is 4.6V+Δ is shown as a function of GVA weight.

First, when the selected GVA weight is 1, GVA_WEIGHT [2:0] 510 may be "LXX". In this case, since GVA_WEIGHT [2] is "L", the first switch 331 of the gamma reference voltage generating circuit 134 may be turned on and the second switch 332 may be turned off. Accordingly, the first switch 331 may provide the (×0.5) ELVDD 601 provided from the voltage divider circuit 310 to the first gamma reference voltage generator 410. Here, (×0.5) ELVDD may be the pixel driving voltage (ELVDD_REF) 311 which has been boosted or reduced by (4.6V+Δ)×0.5.

The first gamma reference voltage generator 410 may generate a first gamma reference voltage (VREGT) 403 of 7.0V+(Δ) by using (4.6V+Δ)×0.5, which is the boosted or reduced pixel driving voltage (ELVDD_REF) 311, and 0.6V, which is a preset first reference voltage (GVA_VREGT_VR) 401.

Next, when the selected GVA weight is 0.6, GVA_WEIGHT[2:0] 510 may be "HLL". Since GVA_WEIGHT[2] is "H" and GVA_WEIGHT[1:0] 301 is "LL", the first switch 331 of the gamma reference voltage generating circuit 134 may be turned off, and the second switch 332 may be turned on. Also, the MUX 320 may receive "LL" as a control signal and provide (×0.3) ELVDD 603 corresponding to "LL" to the first gamma reference voltage generator 410. Here, (×0.3) ELVDD may be the pixel driving voltage (ELVDD_REF) 311 which has been boosted or reduced by (4.6V+Δ)×0.3.

The first gamma reference voltage generator 410 may generate the first gamma reference voltage (VREGT) 403 of 7.0V+(0.64) by using (4.6V+Δ)×0.3, which is the boosted or reduced pixel driving voltage (ELVDD_REF) 311, and 1.06V, which is a preset first reference voltage (GVA_VREGT_VR) 401.

Next, when the selected GVA weight is 1.4, GVA_WEIGHT[2:0] 510 may be "HHH". Since GVA_WEIGHT[2] is "H" and GVA_WEIGHT[1:0] 301 is "HH", the first switch 331 of the gamma reference voltage generating circuit 134 may be turned off, and the second switch 332 may be turned on. Also, the MUX 320 may receive "HH" as a control signal and provide (×0.7) ELVDD corresponding to "HH" to the first gamma reference voltage generator 410. Here, (×0.7) ELVDD may be the pixel driving voltage (ELVDD_REF) 311 which has been boosted or reduced by (4.6V+Δ)×0.7.

The first gamma reference voltage generator 410 may generate the first gamma reference voltage (VREGT) 403 of 7.0V+(1.44) by using (4.6V+Δ)×0.7, which is the boosted or reduced pixel driving voltage (ELVDD_REF) 311, and 0.14V, which is a preset first reference voltage (GVA_VREGT_VR) 401.

Even when the selected GVA weight is 0.8 or 1.2, the first gamma reference voltage (VREGT) 403 may be generated in the same manner as described above.

Figure 7A:
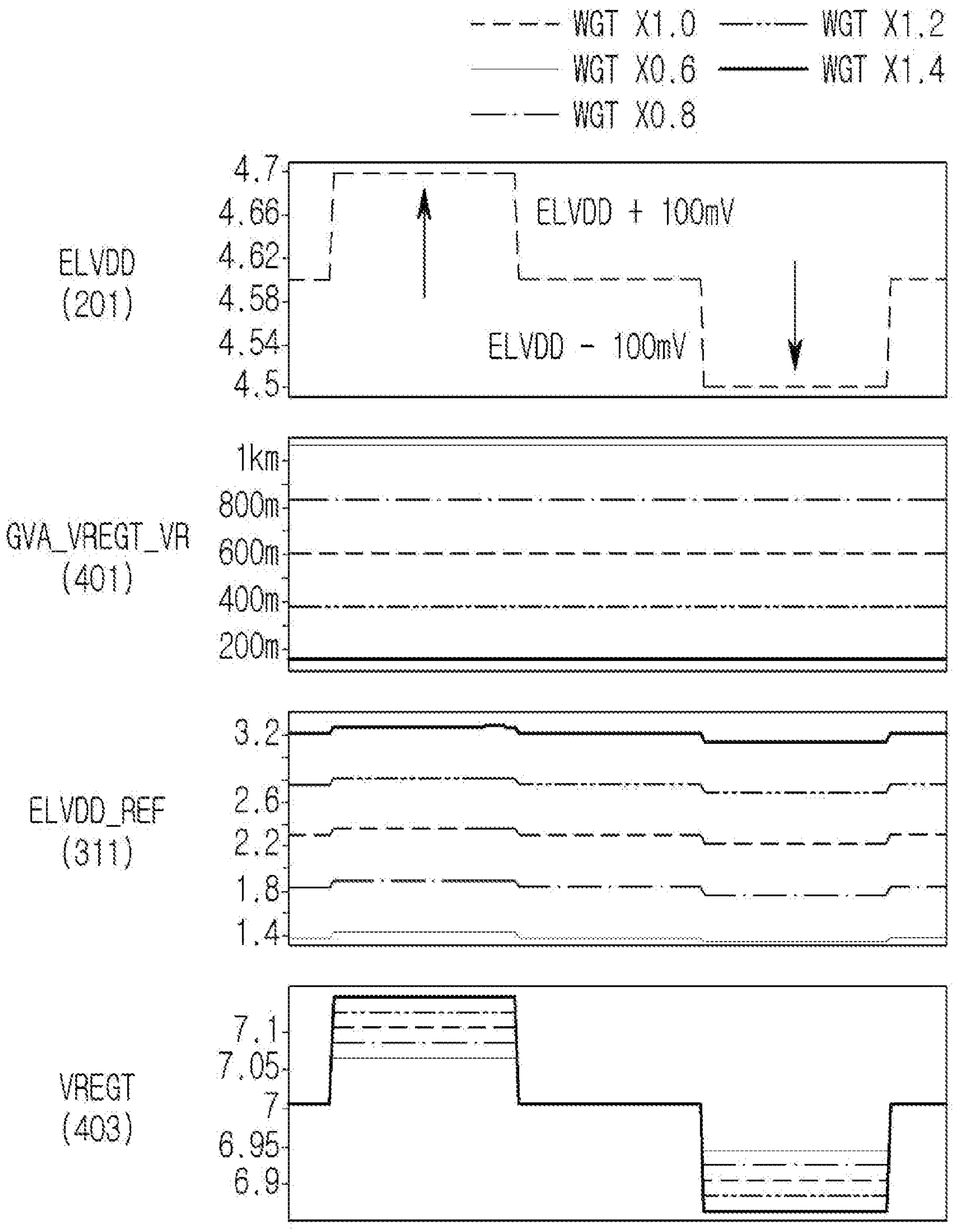
FIGS. 7A and 7B illustrate a first gamma reference voltage (VREGT) for each GVA weight according to a change in a pixel driving voltage (ELVDD) in one or more embodiments of the present disclosure.
Figure 7B:
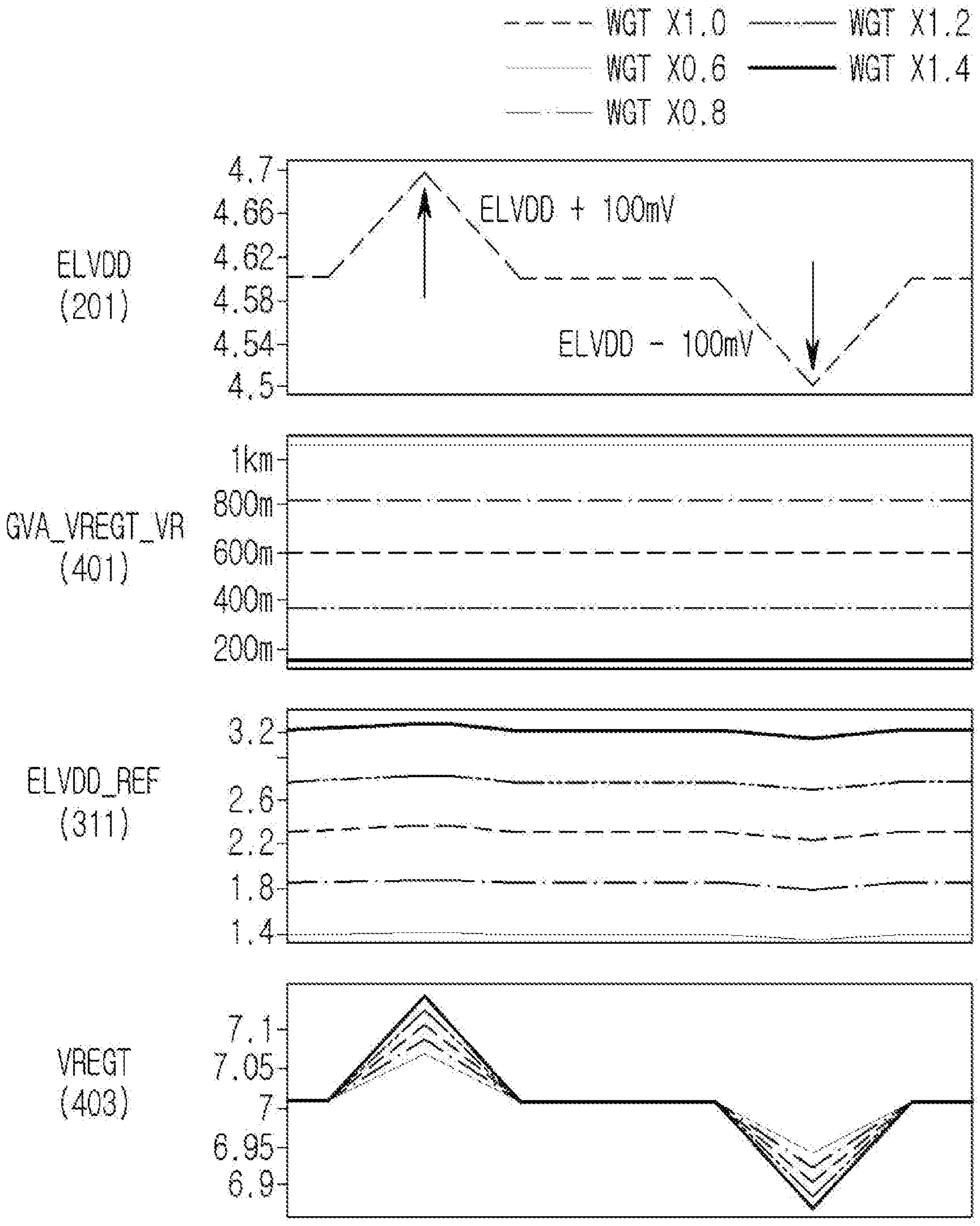

FIGS. 7A and 7B illustrate a first gamma reference voltage (VREGT) 403 for each GVA weight according to a change in the pixel driving voltage ELVDD in one or more embodiments of the present disclosure. Referring to FIGS. 7A and 7B, it can be seen that, when the pixel driving voltage (ELVDD 201) changes, the first gamma reference voltage (VREGT) 403 changes to a different value depending on the GVA weight.

Figure 8:
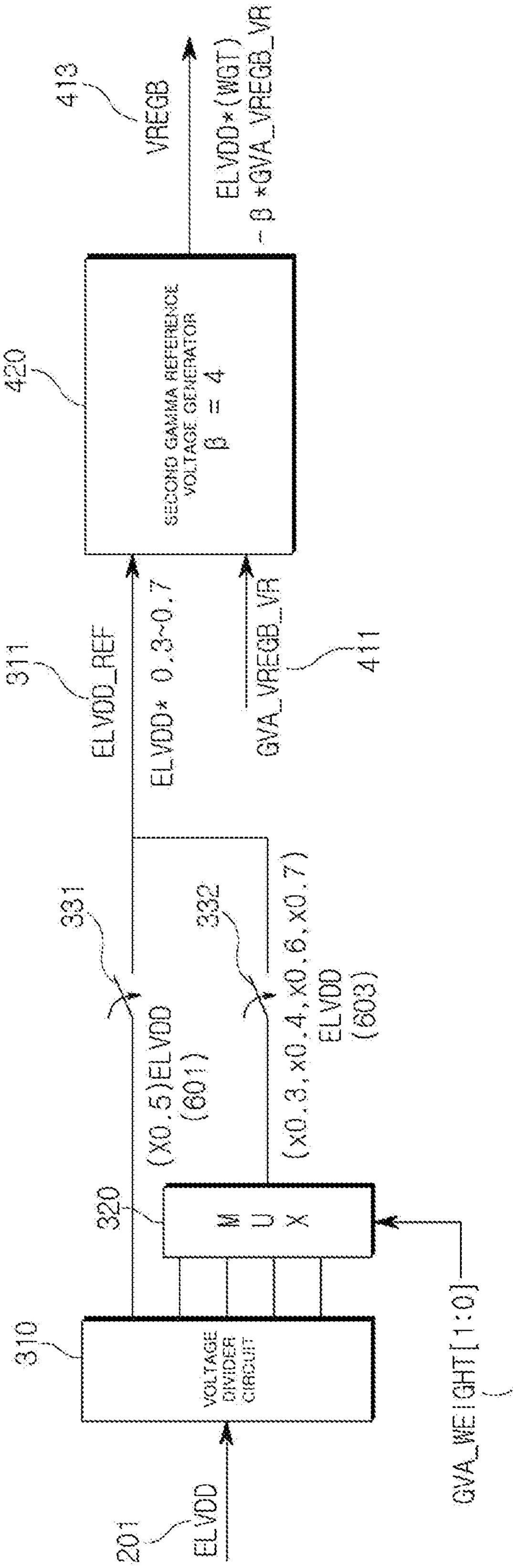
FIG. 8 illustrates an exemplary diagram of generating a second gamma reference voltage (VREGB) based on a GVA weight in one or more embodiments of the present disclosure.

FIG. 8 illustrates an exemplary diagram of generating a second gamma reference voltage (VREGB) based on a GVA weight, in various embodiments of the present disclosure.

Referring to the table of FIG. 8, it shows the second gamma reference voltage generated by the gamma reference voltage generating circuit 134 based on the GVA weight when the pixel driving voltage (ELVDD) 201 is 4.6V+A.

First, when the selected GVA weight is 1, GVA_WEIGHT [2:0] 510 may be "LXX". In this case, since GVA_WEIGHT [2] is "L", the first switch 331 of the gamma reference voltage generating circuit 134 may be turned on and the second switch 332 may be turned off. Accordingly, the first switch 331 may provide the (×0.5) ELVDD 601 provided from the voltage divider circuit 310 to the second gamma reference voltage generator 420. Here, (×0.5) ELVDD may be the pixel driving voltage (ELVDD_REF) 311 which has been boosted or reduced by (4.6V+Δ)× 0.5.

The second gamma reference voltage generator 420 may generate a second gamma reference voltage (VREGB) 413 of 1.0V+(Δ) by using (4.6V+Δ)×0.5, which is the boosted or reduced pixel driving voltage (ELVDD_REF) 311, and 0.9V, which is a preset second reference voltage (GVA_VREGB_VR) 411.

Next, when the selected GVA weight is 0.6, GVA_WEIGHT[2:0] 510 may be "HLL". Since GVA_WEIGHT[2] is "H" and GVA_WEIGHT [1:0] 301 is "LL", the first switch 331 of the gamma reference voltage generating circuit 134 may be turned off, and the second switch 332 may be turned on. Also, the MUX 320 may receive "LL" as a control signal and provide (×0.3) ELVDD 603 corresponding to "LL" to the second gamma reference voltage generator 420. Here, (×0.3) ELVDD may be the pixel driving voltage (ELVDD_REF) 311 which has been boosted or reduced by (4.6V+Δ)×0.3.

The second gamma reference voltage generator 420 may generate a second gamma reference voltage (VREGB) 413 of 1.0V+(0.64) by using (4.6V+Δ)× 0.3, which is the boosted or reduced pixel driving voltage (ELVDD_REF) 311, and 0.44V, which is a preset second reference voltage (GVA_VREGB_VR) 411.

Next, when the selected GVA weight is 1.4, GVA_WEIGHT[2:0] 510 may be "HHH". Since GVA_WEIGHT[2] is "H" and GVA_WEIGHT[1:0] 301 is "HH", the first switch 331 of the gamma reference voltage generating circuit 134 may be turned off, and the second switch 332 may be turned on. Also, the MUX 320 may receive "HH" as a control signal and provide (×0.7) ELVDD 603 corresponding to "HH" to the second gamma reference voltage generator 420. Here, (×0.7) ELVDD 603 may be the pixel driving voltage (ELVDD_REF) 311 which has been boosted or reduced by (4.6V+Δ)× 0.7.

The second gamma reference voltage generator 420 may generate the second gamma reference voltage (VREGB) 413 of 1.0V+(1.44) by using (4.6V+Δ)× 0.7, which is the boosted or reduced pixel driving voltage (ELVDD_REF) 311, and 1.36V, which is a preset second reference voltage (GVA_VREGB_VR) 411.

Even when the selected GVA weight is 0.8 or 1.2, the second gamma reference voltage (VREGB) 413 may be generated in the same manner as described above.

Figure 9A:
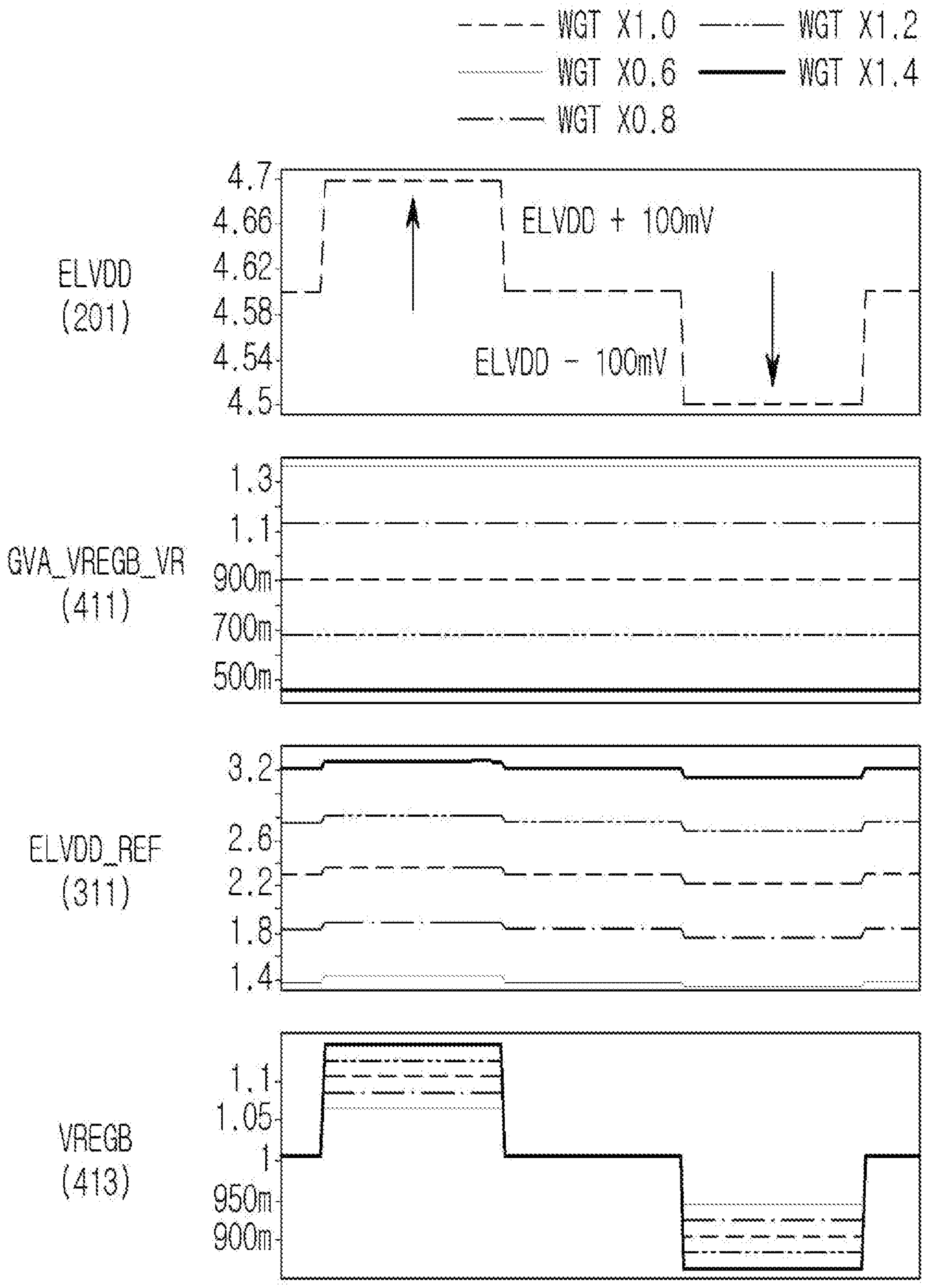
FIGS. 9A and 9B illustrate a second gamma reference voltage (VREGB) for each GVA weight according to a change in a pixel driving voltage (ELVDD) in one or more embodiments of the present disclosure.
Figure 9B:
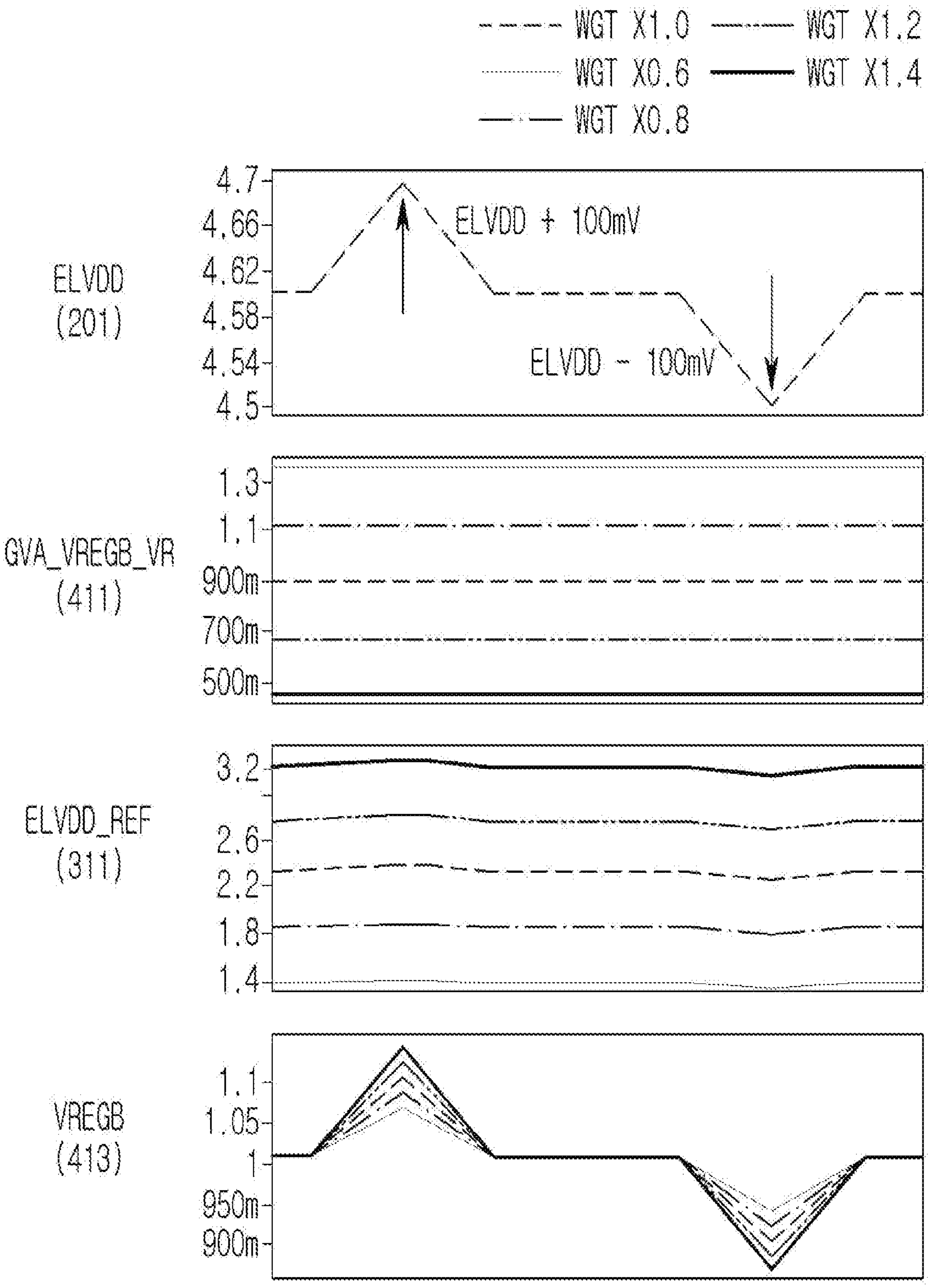

FIGS. 9A and 9B illustrate a second gamma reference voltage (VREGB) 413 for each GVA weight according to a change in a pixel driving voltage (ELVDD) in various embodiments of the present disclosure. Referring to FIGS. 9A and 9B, it can be seen that, when the pixel driving voltage (ELVDD) 201 changes, the second gamma reference voltage (VREGB) 413 changes to a different value depending on the GVA weight.

Figure 10:
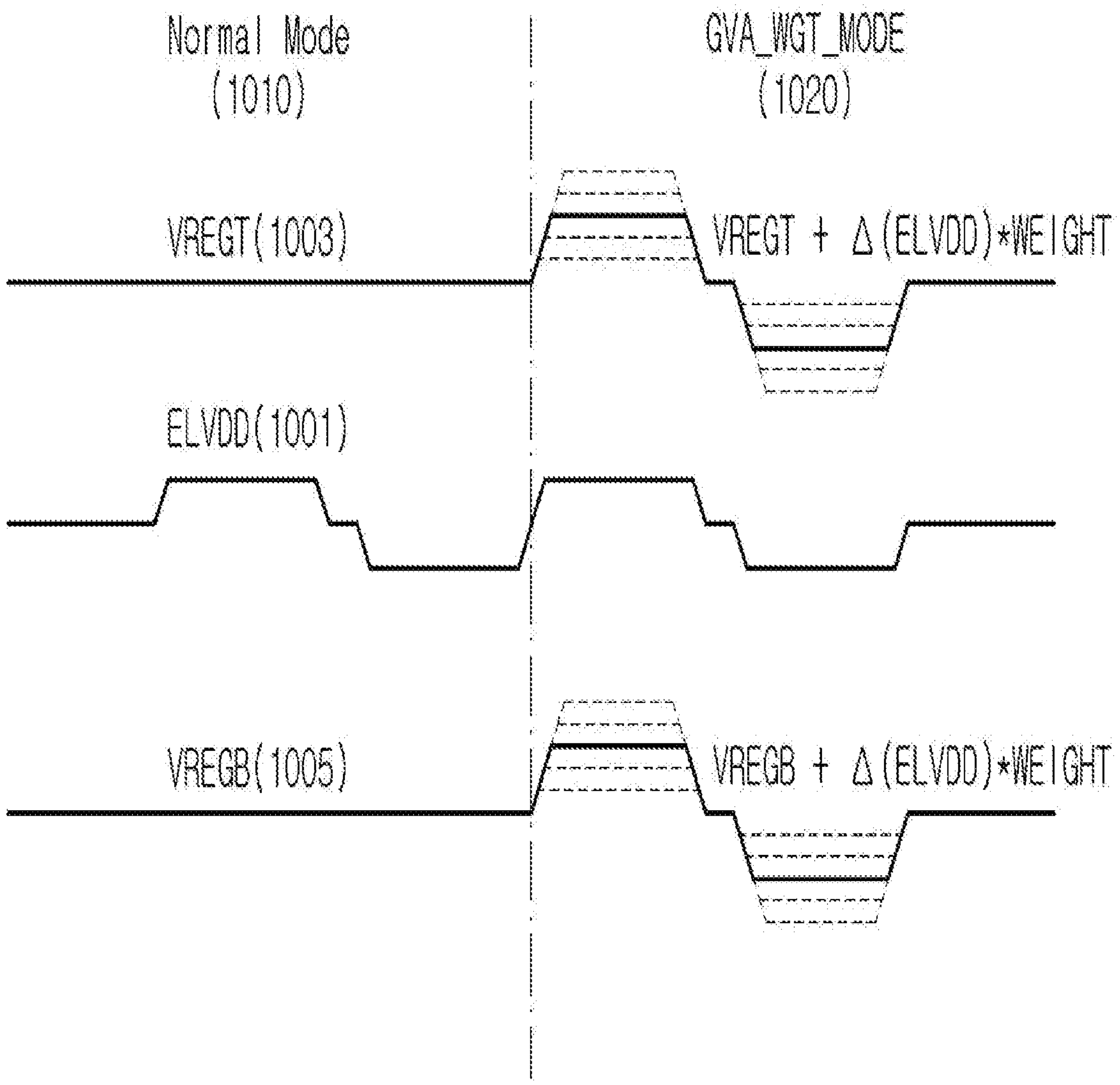
FIG. 10 illustrates a gamma reference voltage generated according to a change in a pixel driving voltage (ELVDD) in a case where a GVA weight is applied and in a case where a GVA weight is not applied according to one or more embodiments of the present disclosure.

FIG. 10 illustrates a gamma reference voltage generated as a function of variation of the pixel driving voltage (ELVDD) with and without GVA weight, in accordance with one or more embodiments of the present disclosure. Here, the case where the GVA weight is applied may be called GVA weight mode (GVA_WGT_MODE) 1020, and the case where the GVA weight is not applied may be called normal mode (Normal Mode) 1010.

Referring to FIG. 10, in the normal mode 1010, an upper limit gamma reference voltage (VREGT) 1003 and a lower limit gamma reference voltage (VREGB) 1005 used to generate the gamma voltage of the DAC remain constant regardless of the pixel driving voltages (ELVDD) 1001.

On the other hand, in the GVA weight mode (GVA_WGT_MODE) 1020 according to one or more embodiments of the present disclosure, the upper limit gamma reference voltage (VREGT) 1003 and the lower limit gamma reference voltage (VREGB) 1005 used to generate the gamma voltage of the DAC may change depending on the GVA weight when the pixel driving voltage (ELVDD) 1001 changes.

That is, in one or more embodiments of the present disclosure, the gamma voltage of the DAC may be adjusted in response to a change in the pixel driving voltage and through this, the analog data voltage of the DAC is allowed to be changed, thereby preventing the luminance from changing in response to a change in the pixel driving voltage.

Figure 11:
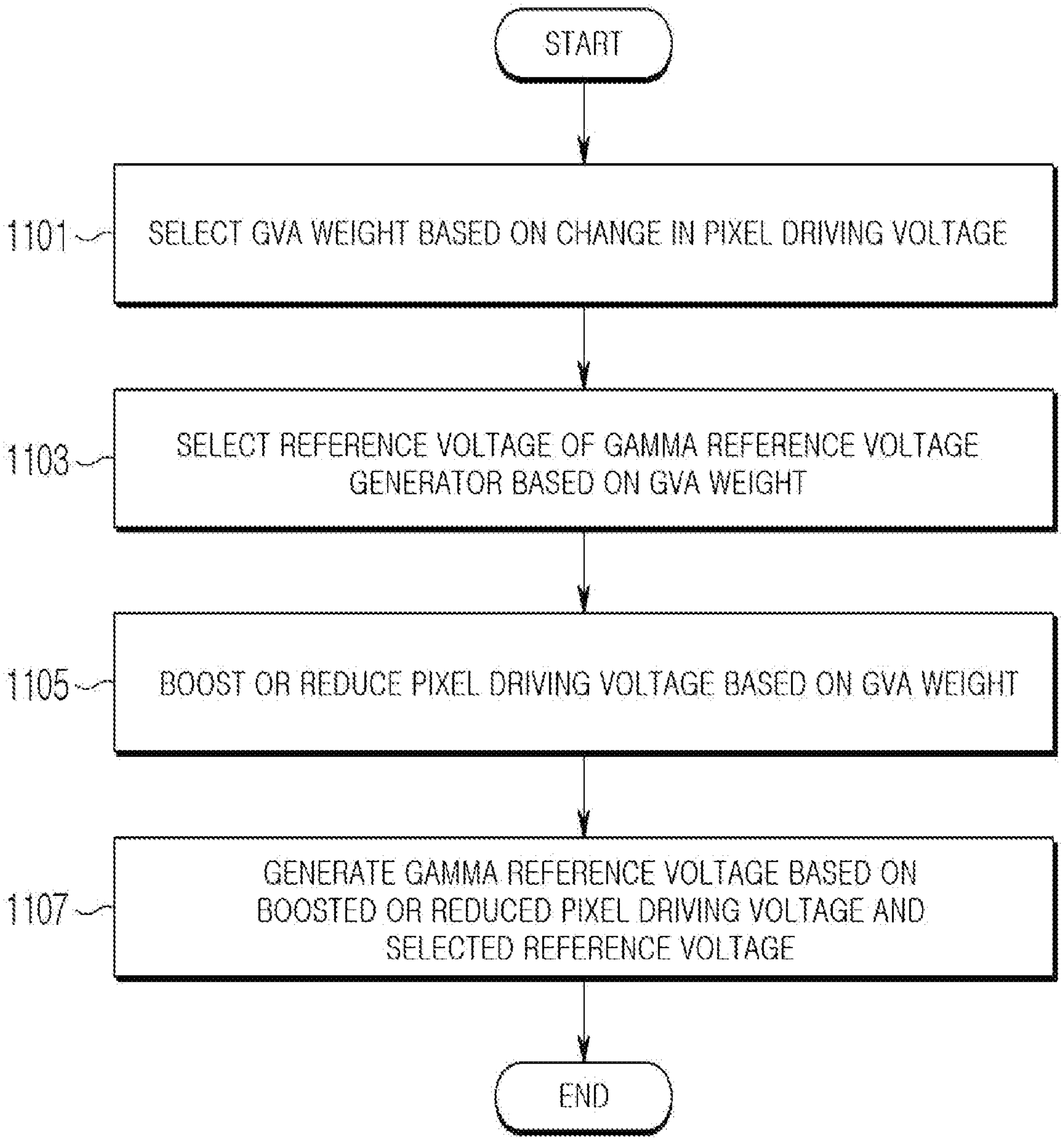
FIG. 11 illustrates a flowchart of adjusting a gamma voltage in a display device according to one or more embodiments of the present disclosure.

FIG. 11 illustrates a flowchart of adjusting a gamma voltage in a display device according to one or more embodiments of the present disclosure.

Referring to FIG. 11, in operation 1101, the weight selector 132 may select a GVA weight based on a change in a pixel driving voltage, caused by a load. The GVA weight may mean a weight for adjusting a gamma voltage. For example, the weight selector 132 may select a GVA weight based on detecting that the pixel driving voltage output from the power supply 110 has dropped or risen due to a load inside the display device. In an example, the weight selector 132 may select a GVA weight based on a difference between the pixel driving voltage (e.g., ELVDD) output from the power supply 110 and the pixel driving voltage (e.g., ELVDD_D±α) received from the driver IC 130. In an example, the weight selector 132 may select a GVA weight based on a difference between a pixel driving voltage (e.g., ELVDD_D±α) input to the driver IC 130 after being changed due to a load between the power supply 110 and the driver IC 130 and a pixel driving voltage (e.g., ELVDD P±2α) input to the display panel 120 after being changed due to a load between the power supply 110 and the display panel 120. The GVA weight may be selected from, for example, any one of 0.6, 0.8, 1.0, 1.2, and 1.4.

In operation 1103, the gamma reference voltage generating circuit 134 may select a reference voltage of the gamma reference voltage generator based on the selected GVA weight. In an example, the gamma reference voltage generator may select a first reference voltage (GVA_VREGT_VR) 401 to be input to the first gamma reference voltage generator 410 and a second reference voltage (GVA_VREGB_VR) 411 to be input to the second gamma reference voltage generator 420 using a pre-stored table containing a reference voltage for each GVA weight, as shown in FIG. 5.

In operation 1105, the gamma reference voltage generating circuit 134 may boost or reduce a pixel driving voltage (ELVDD) to be input to the gamma reference voltage generator based on the selected GVA weight. In an example, a pixel driving voltage may be boosted or reduced by a specified multiple based on a GVA_WEIGHT[2:0] signal corresponding to the selected GVA weight. The specified multiple may be a half value of the GVA weight corresponding to the GVA_WEIGHT[2:0] signal. For example, when the selected GVA weight is 1, the pixel driving voltage may be boosted or reduced by 0.5 times. As another example, when the selected GVA weight is 0.6, the pixel driving voltage may be boosted or reduced by 0.3 times. In an example, the gamma reference voltage generating circuit 134 may boost or reduce the pixel driving voltage by a specified multiple based on the selected GVA weight using the voltage divider circuit 310, the MUX 320, the first switch 331, and the second switch 332.

In operation 1107, the gamma reference voltage generating circuit 134 may generate a gamma reference voltage based on the boosted or reduced pixel driving voltage and the selected reference voltage. In an example, the gamma reference voltage generating circuit 134 may generate a first gamma reference voltage 403 that is the upper limit of the gamma reference voltage and a second gamma reference voltage 413 that is the lower limit of the gamma reference voltage using the first gamma reference voltage generator 410 and the second gamma reference voltage generator 420. For example, the gamma reference voltage generating circuit 134 may generate the first gamma reference voltage (VREGT) 403 using the first gamma reference voltage generator 410 that receives the boosted or reduced pixel driving voltage and the first reference voltage (GVA_VREGT_VR) 401. The first gamma reference voltage generator 410 may boost the boosted or reduced pixel driving voltage by two times, multiply the first reference voltage (GVA_VREGT_VR) 401 by a specified coefficient β, and then add the pixel driving voltage (ELVDD_REF×2) which has been boosted by two times, and the first reference voltage (β×GVA_VREGT_VR), to which the specified coefficient β has been applied, to generate the first gamma reference voltage (VREGT) 403. The gamma reference voltage generating circuit 134 may generate the second gamma reference voltage (VREGB) 413 using the second gamma reference voltage generator 420 that receives the boosted or reduced pixel driving voltage and the second reference voltage (GVA_VREGB_VR) 411. The second gamma reference voltage generator 420 may boost the boosted or reduced pixel driving voltage by two times, multiply the second reference voltage (GVA_VREGB_VR) 411 by a specified coefficient β, and then subtract the second reference voltage (β×GVA_VREGB_VR), to which the specified coefficient β has been applied, from the pixel driving voltage (ELVDD_REF×2), which has been boosted by two times to generate the second gamma reference voltage (VREGB) 413.

The first gamma reference voltage (VREGT) 403 and the second gamma reference voltage (VREGB) 413 generated as described above may be used by the gamma voltage output circuit 136 to generate and output a gamma voltage of the DAC.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A display device, comprising:

a display panel including a plurality of pixels;

a driver integrated circuit (IC) configured to convert digital data corresponding to an input image to an analog data voltage using a gamma voltage, and to supply the analog data voltage to the plurality of pixels; and a power supply configured to supply a pixel driving voltage to the display panel and the driver IC, wherein the driver IC comprises:

a weight selector configured to select a weight for adjusting the gamma voltage based on a change amount of the pixel driving voltage supplied from the power supply; and a gamma reference voltage generating circuit configured to boost and reduce the pixel driving voltage by a specified multiple based on the selected weight and to generate a gamma reference voltage that changes according to the selected weight and the boosted and reduced pixel driving voltage, wherein the gamma reference voltage increases proportionally with the selected weight when the pixel driving voltage increases, and wherein the specified multiple is equal to half of the selected weight.

2. The display device of claim 1, wherein the gamma reference voltage generating circuit comprises:

a weight circuit configured to generate the boosted and reduced pixel driving voltage by the specified multiple based on the selected weight; and a gamma reference voltage generator configured to generate the changed gamma reference voltage depending on the boosted and reduced pixel driving voltage and a reference voltage corresponding to the selected weight.

3. The display device of claim 2, wherein the weight circuit comprises:

a voltage divider circuit configured to divide the pixel driving voltage using a plurality of series-connected resistor elements;

a multiplexer connected to the voltage divider circuit and configured to select and output one of pixel driving voltages obtained through division by the voltage divider circuit according to a first control signal generated based on the selected weight;

a first switch connected between the voltage divider circuit and the gamma reference voltage generator and configured to be turned on/off by a second control signal generated based on the selected weight; and a second switch connected between the multiplexer and the gamma reference voltage generator and configured to be turned on/off by the second control signal.

4. The display device of claim 3, wherein the second control signal selectively turns on one of the first switch and the second switch.

5. The display device of claim 2, wherein the reference voltage is determined based on a table indicating at least one reference voltage for each weight.

6. The display device of claim 2, wherein the gamma reference voltage generator comprises:

a first gamma reference voltage generator configured to generate a first gamma reference voltage based on the boosted and reduced pixel driving voltage and a first reference voltage corresponding to the selected weight; and a second gamma reference voltage generator configured to generate a second gamma reference voltage based on the boosted and reduced pixel driving voltage and a second reference voltage corresponding to the selected weight, and wherein the first gamma reference voltage is an upper limit value, and the second gamma reference voltage is a lower limit value.

7. The display device of claim 1, wherein the weight is determined based on a difference between the pixel driving voltage output from the power supply and the pixel driving voltage input to the driver IC.

8. The display device of claim 1, wherein the weight is determined based on a difference between the pixel driving voltage input to the driver IC and the pixel driving voltage input to the display panel.

9. The display device of claim 1, wherein the driver IC further comprises a gamma reference voltage output circuit configured to generate and output the gamma voltage based on the changed gamma reference voltage.

10. A method for operating a display device comprising a display panel, a driver IC, and a power supply, the method comprising:

selecting, by the driver IC, a weight for adjusting a gamma voltage for a Digital-to-Analog Converter (DAC) based on a change amount of a pixel driving voltage supplied from the power supply;

boosting and reducing the pixel driving voltage by a specified multiple based on the selected weight;

generating, by the driver IC, a gamma reference voltage that is used to generate the gamma voltage and that changes according to the selected weight and boosted and reduced pixel driving voltage; and adjusting, by the driver IC, the gamma voltage using the changed gamma reference voltage, wherein the gamma reference voltage increases proportionally with the selected weight when the pixel driving voltage increases, and wherein the specified multiple is equal to half of the selected weight.

11. The method of claim 10, wherein the generating of the changed gamma reference voltage comprises:

generating the changed gamma reference voltage depending on the boosted and reduced pixel driving voltage and a reference voltage corresponding to the selected weight.

12. The method of claim 11, wherein the pixel driving voltage is boosted and reduced by the specified multiple using a voltage divider circuit comprising:

a plurality of series-connected resistor elements to divide the pixel driving voltage; and a multiplexer connected to the voltage divider circuit.

13. The method of claim 12, wherein the multiplexer operates according to a control signal generated based on the selected weight.

14. The method of claim 11, wherein the reference voltage is determined based on a table indicating at least one reference voltage for each weight.

15. The method of claim 11, wherein the generating of the changed gamma reference voltage comprises:

generating a first gamma reference voltage based on the boosted and reduced pixel driving voltage and a first reference voltage corresponding to the selected weight; and generating a second gamma reference voltage based on the boosted and reduced pixel driving voltage and a second reference voltage corresponding to the selected weight, and wherein the first gamma reference voltage is an upper limit value, and the second gamma reference voltage is a lower limit value.

16. The method of claim 10, wherein the selecting of the weight comprises:

selecting the weight based on a difference between the pixel driving voltage output from the power supply and the pixel driving voltage input to the driver IC.

17. The method of claim 10, wherein the selecting of the weight comprises:

selecting the weight based on a difference between the pixel driving voltage input to the driver IC and the pixel driving voltage input to the display panel.

* * * * *